(12) United States Patent
Holestine

(10) Patent No.: US 9,631,770 B2
(45) Date of Patent: Apr. 25, 2017

(54) BRACKET FOR FIXING A PANEL TO A T-POST

(71) Applicant: Edward James Holestine, Ellensburg, WA (US)

(72) Inventor: Edward James Holestine, Ellensburg, WA (US)

( * ) Notice: Subject to any disclaimer, the term of this patent is extended or adjusted under 35 U.S.C. 154(b) by 0 days.

(21) Appl. No.: 14/679,454

(22) Filed: Apr. 6, 2015

(65) Prior Publication Data
US 2016/0290552 A1    Oct. 6, 2016

(51) Int. Cl.
*F16M 13/02* (2006.01)
*E04H 17/14* (2006.01)

(52) U.S. Cl.
CPC ......... *F16M 13/02* (2013.01); *E04H 17/1421* (2013.01)

(58) Field of Classification Search
CPC .. F16B 7/04; F16B 7/00; F16B 7/0493; B23P 11/00; Y10T 29/4995; Y10T 29/49948; Y10T 403/32; Y10T 403/4608; E04H 17/1421
USPC ......... 248/218.4, 219.1, 219.2, 219.3, 220.1; 256/65.02, 65.03, DIG. 5, DIG. 6; 52/712, 665
See application file for complete search history.

(56) References Cited

U.S. PATENT DOCUMENTS

| | | | | |
|---|---|---|---|---|
| 813,253 A | * | 2/1906 | Sullivan | E04G 11/12 249/27 |
| 1,423,991 A | * | 7/1922 | Brooks | E04F 21/05 52/370 |
| 1,699,557 A | * | 1/1929 | Yeager | E04B 5/12 52/365 |
| 1,915,535 A | * | 6/1933 | Johnson | E04H 12/2215 52/153 |
| 2,191,979 A | * | 2/1940 | Bierbach | E04B 5/12 52/365 |
| 2,227,553 A | * | 1/1941 | Paque | E04H 17/06 256/21 |
| 2,705,548 A | * | 4/1955 | Lionberger | E04H 12/223 52/153 |
| 3,468,428 A | * | 9/1969 | Reibold | A47F 5/06 108/103 |
| 3,491,985 A | * | 1/1970 | Grimsley | E04H 12/2215 256/47 |
| 3,537,221 A | * | 11/1970 | Helfman | E04B 5/12 403/232.1 |
| 3,669,480 A | * | 6/1972 | Fugate | E04G 21/3223 248/300 |
| 3,693,312 A | * | 9/1972 | Miller | E04B 1/4121 220/DIG. 25 |
| 3,884,008 A | * | 5/1975 | Miller | E04B 1/4121 220/DIG. 25 |

(Continued)

*Primary Examiner* — Kimberly Wood
(74) *Attorney, Agent, or Firm* — Thomson Law PLLC

(57) ABSTRACT

A bracket for attaching (removably or fixedly) a panel, board, sign, fence, or other long, flat object to a t-post, is described. In some embodiments, the bracket includes a t-post attachment portion, the t-post attachment portion including a face plate and two opposing side plates, the face plate extending between the two opposing side plates and fixed to front edges of the two opposing side plates, and a panel attachment portion, the panel attachment portion including a flat plate, the flat plate fixed to back edges of the two opposing side plates.

10 Claims, 7 Drawing Sheets

(56) References Cited

U.S. PATENT DOCUMENTS

| | | | | |
|---|---|---|---|---|
| 4,078,754 A * | 3/1978 | Gould | | E04H 17/06 248/218.4 |
| 4,252,472 A * | 2/1981 | Moraly | | E04H 17/263 173/126 |
| 4,412,396 A * | 11/1983 | Silbernagel | | E01F 9/012 40/606.11 |
| 4,801,121 A * | 1/1989 | Zunker | | E05B 67/383 248/218.4 |
| 4,889,322 A * | 12/1989 | Wagner | | E04H 17/08 256/36 |
| 5,004,369 A * | 4/1991 | Young | | E04B 1/2612 403/232.1 |
| 5,046,705 A * | 9/1991 | Williams | | E04H 17/08 256/36 |
| 5,186,571 A * | 2/1993 | Hentzschel | | E04B 1/2608 256/65.06 |
| 5,224,241 A * | 7/1993 | Williams | | E05D 5/0215 16/253 |
| 5,273,246 A * | 12/1993 | Stahara | | H01F 27/06 248/218.4 |
| 5,653,079 A * | 8/1997 | Loeffler | | E04B 1/2608 403/396 |
| 5,689,918 A * | 11/1997 | Johnson | | E04H 12/2215 404/9 |
| 6,247,553 B1 * | 6/2001 | Jones | | E06C 9/04 182/92 |
| 6,295,781 B1 * | 10/2001 | Thompson | | E04B 1/2608 403/232.1 |
| 6,394,228 B1 * | 5/2002 | Stephens | | E06C 9/04 182/119 |
| 7,162,837 B1 * | 1/2007 | Roth | | E04B 9/183 52/120 |
| 7,559,519 B1 * | 7/2009 | Dragic | | E04B 2/7457 248/216.1 |
| 7,621,096 B2 * | 11/2009 | Ellis | | E04B 2/7457 52/489.1 |
| 7,712,283 B2 * | 5/2010 | Gadd | | E04B 1/2612 248/218.4 |
| 8,720,844 B2 * | 5/2014 | Westimayer | | F16M 13/02 248/218.4 |
| 8,910,367 B2 * | 12/2014 | Adams, Jr. | | F16B 7/04 29/525.02 |
| 8,959,857 B1 * | 2/2015 | Lin | | E04H 12/2261 256/65.14 |
| 8,966,857 B2 * | 3/2015 | Pope | | E04B 1/2604 403/232.1 |
| 2008/0157048 A1 * | 7/2008 | Beachler | | E04F 11/1812 256/65.03 |
| 2010/0288992 A1 * | 11/2010 | Gray | | E04H 17/1421 256/65.03 |
| 2012/0261634 A1 * | 10/2012 | Graves | | E04H 17/20 256/65.03 |
| 2014/0264220 A1 * | 9/2014 | Doyle | | E04H 17/1421 256/65.06 |

* cited by examiner

BRACKET FOR FIXING A PANEL TO A T-POST

BACKGROUND

Steel fence posts are types of fence posts or pickets that are easy to place into the ground, and include t-posts, y-posts, star posts, and so on. The posts include studs or nubs that extend along the spine of the posts and facilitate the attachment of mesh or barbed wire to the posts, such as when the posts are utilized to fence in an area or location or provide a boundary along a periphery of a location.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIGS. 4, 4A, 4B, 4C, and 4D show an alternative bracket for attaching a panel to a t-post.

DETAILED DESCRIPTION

Overview

Various brackets for attaching (e.g., removably or fixedly) a panel, board, sign, fence, or other long, flat object to a t-post, are described.

In some embodiments, a bracket includes a t-post attachment portion, the t-post attachment portion including a face plate and two opposing side plates, the face plate extending between the two opposing side plates and fixed to front edges of the two opposing side plates, and a panel attachment portion, the panel attachment portion including a flat plate, the flat plate fixed to back edges of the two opposing side plates.

In some embodiments, a bracket may facilitate attaching a panel to a t-post by positioning the t-post within an opening of an attachment bracket, the opening formed by two opposing side plates, a face plate extending between the two opposing side plates and fixed to front edges of the two opposing side plates, and a flat plate fixed to back edges of the two opposing side plates, removably securing the attachment bracket to the t-post by positioning the face plate on a nub of the t-post such that the flat plate contacts a back of the t-post, and fastening the panel to the flat plate of the attachment bracket.

In some embodiments, a bracket may include a flat center plate having a hole, the hole configured to receive a nub of the t-post such that the bracket rests on the nub of the t-post when the bracket is attached to the t-post, and one or more bendable wing plates located on sides of the flat center plate, the bendable wing plates configured to fix the panel to the t-post.

Thus, in some embodiments, the brackets described herein enable a quick and efficient way to attach a panel, fence, board, or other flat object to a t-post or other steel fence posts.

Examples of the Bracket

Figure 1:
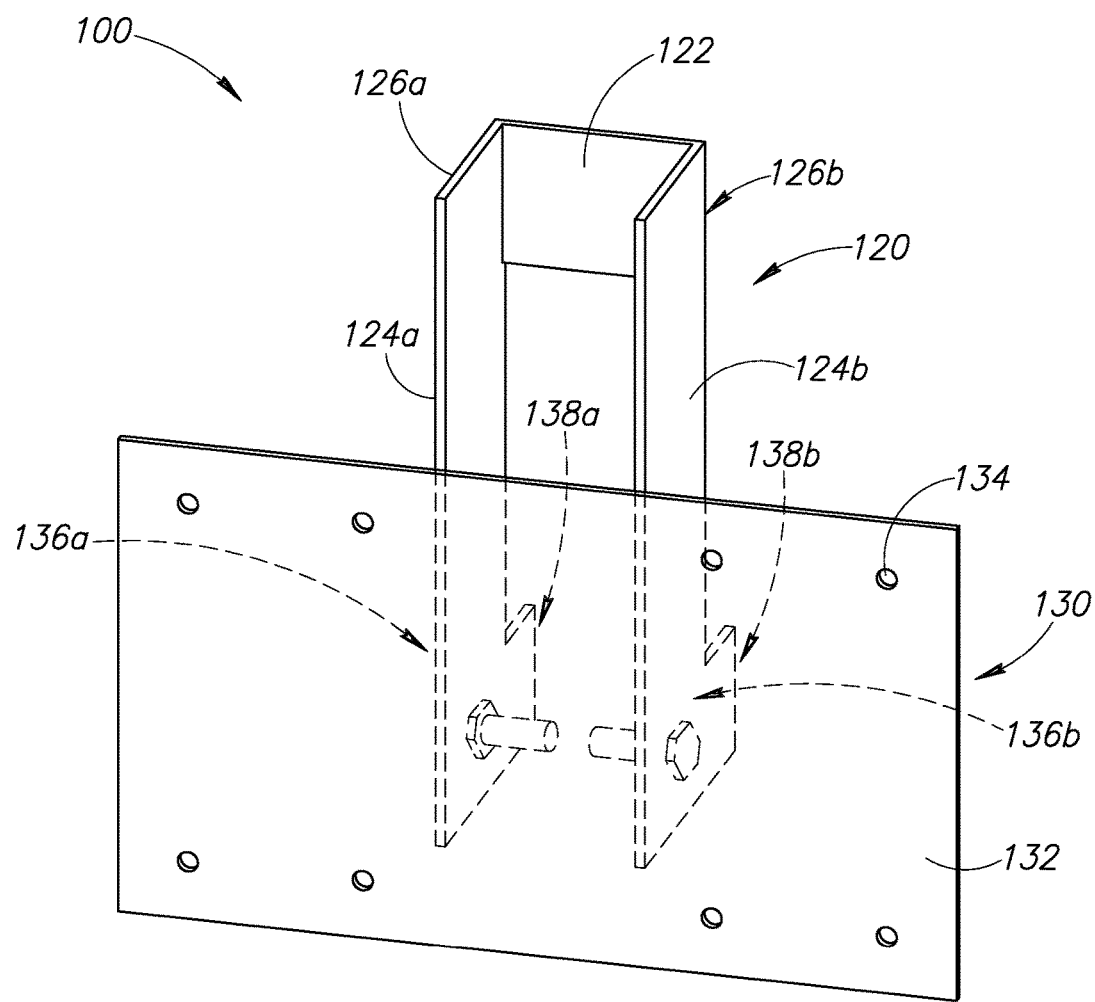
FIG. 1 shows an example bracket for attaching a panel to a t-post.
Figure 2:
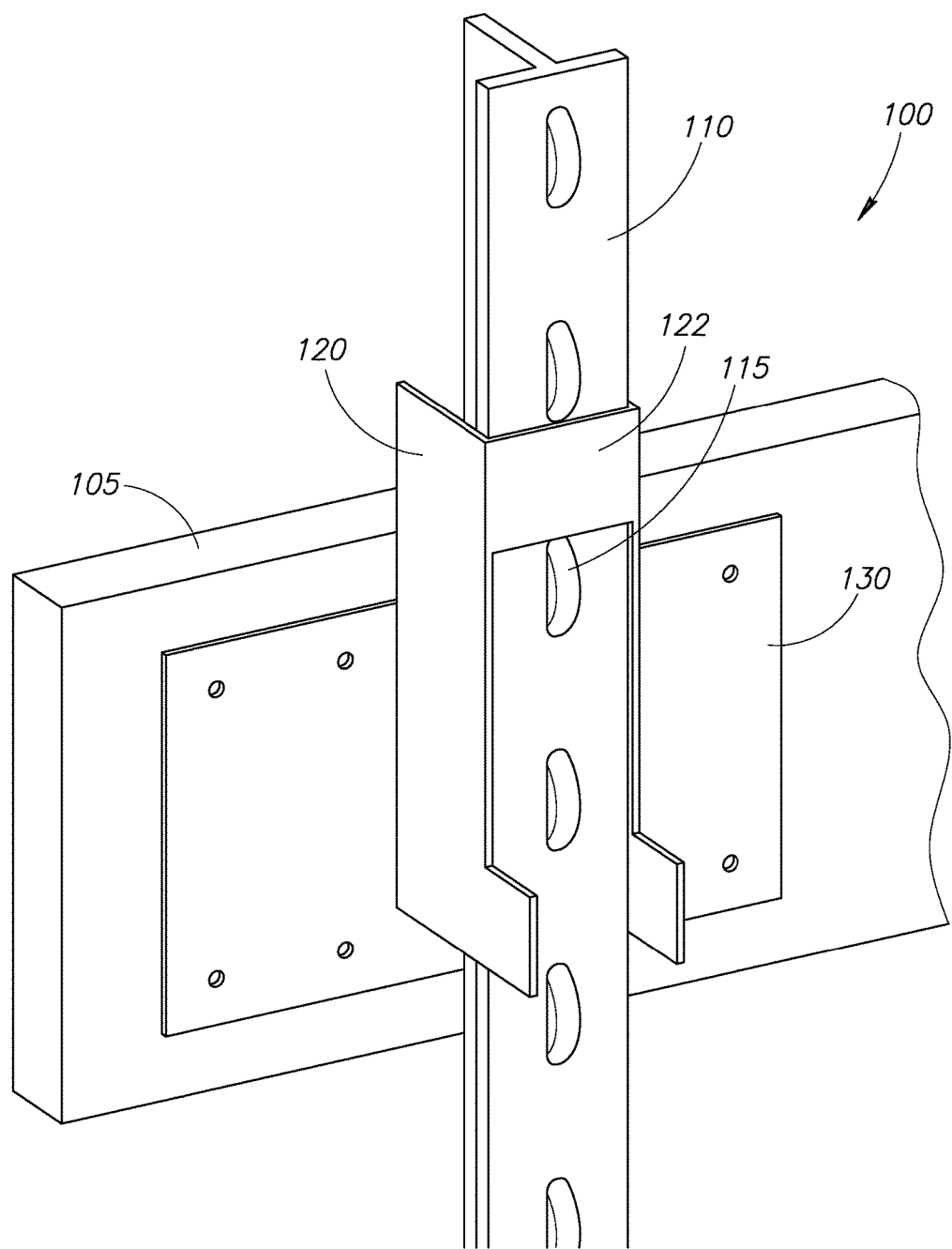
FIG. 2 shows the bracket removably attached to a t-post.

FIGS. 1 and 2 depict a bracket for attaching a panel to a t-post. As described herein, the bracket 100, or attachment bracket, removable or fixedly attaches or secures a panel (not shown) to a fence post 110, such as a t-post. The panel may be any flat object, such as a fence, board, sign, wood beam, and so on. The fence post 110 may be a steel or metal fence post, such as a t-post, y-post, or other metal fence post, that is placed into the ground by hammering or pounding the post into the ground (e.g., without requiring the digging of post holes).

The bracket 100 includes a t-post attachment portion 120. The t-post attachment portion 120 includes a face plate 122 and two opposing side plates 124a and 124b. The face 122 plate extends between the two opposing side plates 124a, 124b, and is fixed to front edges 126a and 126b of the two opposing side plates 124a, 124b. In some embodiments, the face plate 122 extends between the two opposing side 124a, 124b plates at upper portions of the two opposing side plates 124a, 124b.

The t-post attachment portion 120 may be configured in a variety of different sizes, shapes, and/or geometries, such as the rectangular shapes depicted in the Figures. For example, the front plate 122 may have a height size that facilitates the front plate 122 fitting between consecutive nubs on the t-post 110, and may have a width that facilitates receiving the t-post in a opening formed by the front plate 122 and the two opposing side plates 124a, 124b. Similarly, the two opposing side plates 124a, 124b may have a height and/or length that facilitates receiving the t-post in a opening formed by the front plate 122 and the two opposing side plates 124a, 124b, as well as allows the attachment portion 120 to snugly attach to the t-post 110. Thus, the sizes and/or shapes of the various components of the attachment portion 120 enable the bracket 100 to be secured and removed from a t-post 110, while restricting movement of the bracket 100 when the bracket 100 is removably or fixedly attached to the t-post 110.

In some embodiments, the two opposing side plates 124a, 124b include bendable tabs 138a and 138b at lower portions of the front edges 126a, 126b of the two opposing side plates 124a, 124b. When the bracket 100 is positioned to attach to the t-post 110, the bendable tabs 138a, 138b may be bent inwardly (e.g., towards the t-post 110) to contact the t-post, which fixedly attaches the bracket 100 to the t-post 110. Further, the bracket 100 may include pins or other structures located on inner surfaces of the lower portions of the two opposing side plates, which may assist in preventing the bracket 100 from moving (e.g., slightly rotating or twisting) when removably attached or otherwise fixed to the t-post 110.

The bracket also includes a panel attachment portion 130. The panel attachment portion 130 may include a face plate 132 and fastener holes or attachment points 134. The flat plate 132 may be fixed (e.g., welded or otherwise secured) to back edges 136a and 136b of the two opposing side plates 124a, 124b.

The bracket 100 may include one or more fasteners (not shown) that secure the flat plate 132 of the bracket 100 to the panel, such as via the holes 134 provided within the flat plate 132.

The flat plate 132 may be configured in a variety of different sizes, shapes, and/or geometries, such as a rectangular shape depicted in the Figures. The flat plate 132 may have a surface area that is larger than a surface area of the face plate 122, and may extend outwardly from the two opposing side plates 124a, 124b (as depicted in the Figures)

to provide suitable attachment surface for attaching a panel to the flat plate 132. For example, the flat plate 132 may extend from one to seven and a half (7 ½) inches from the two opposing side plates 124a, 124b, and may have a height that is one to six inches. Thus, the sizes and/or shapes of the various components of the panel attachment portion 130 are configured to securely fix the bracket 100 to variously different shaped panels, fences, board, signs, and so on.

Thus, as shown in FIG. 2, the bracket 100 is configured to removably attach to the t-post 110 when the face plate 122 rests on a nub 115 of the t-post 110 and the back plate 132 contacts a back 117 of the t-post 110. Therefore, using the attachment bracket 100 described herein, the method or process of removably or fixedly attaching the bracket 100 to the t-post 110, in order to facilitate attaching a panel to the t-post 110, may be a simple process having the following steps:

First, the t-post 110 is positioned within an opening of the attachment bracket 100, such as the opening formed by the two opposing side plates 124a, 124b, the face plate 122, which extends between the two opposing side plates 124a, 124b and is fixed to the front edges 126a, 126b of the two opposing side plates 124a, 124b, and a flat plate 132 fixed to the back edges 136a, 136b of the two opposing side plates 124a, 124b.

Next, the attachment bracket 100 is removably attached or secured to the t-post 110 by positioning the face plate 122 on the nub 115 of the t-post 110, such that the flat plate 132 contacts a back of the t-post 110.

Then, a panel is fastened or otherwise fixed or secured to the flat plate 132 of the attachment bracket 100, such as via screws or other fasteners that fix the panel to the flat plate 132 at the attachment points 134.

In some embodiments, the tabs 138a, 138b may be bent inwardly (e.g., they may be hammered or otherwise forced to an inward position) to contact the t-post 110, which causes the bracket 100 to be fixedly attached to the t-post 110.

As described herein, the bracket 100, the t-post attachment portion 110, and/or the panel attachment portion 120 may be configured to attach to a t-post 110 and join the ends of two different panels or other boards, such as to form corners with the two different panels, to connect one structure to another structure (e.g., a fence or section of a corral to another fence or section of a corral), and so on.

Thus, in some embodiments, the panel attachment portion 120, or a section thereof, may be placed or located on one of the opposing side plates 124a, 124b, and/or may be bent or shaped to provide a variety of panel joining surfaces (2D or 3D) that facilitate the joining of one panel to another in space.

Figure 3:
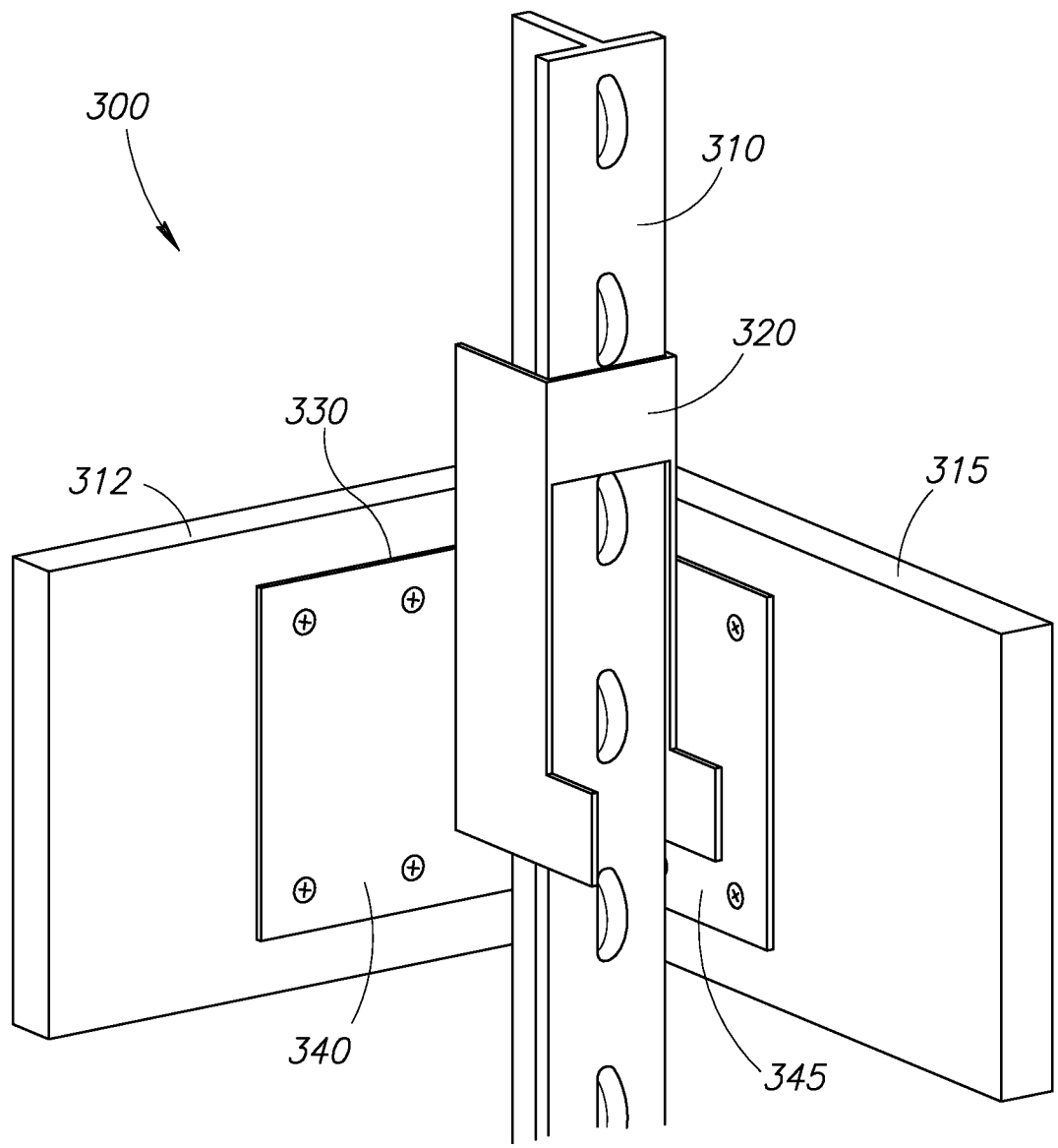
FIGS. 3 and 3A show an alternative bracket for attaching a panel to a t-post.
Figure 3A:
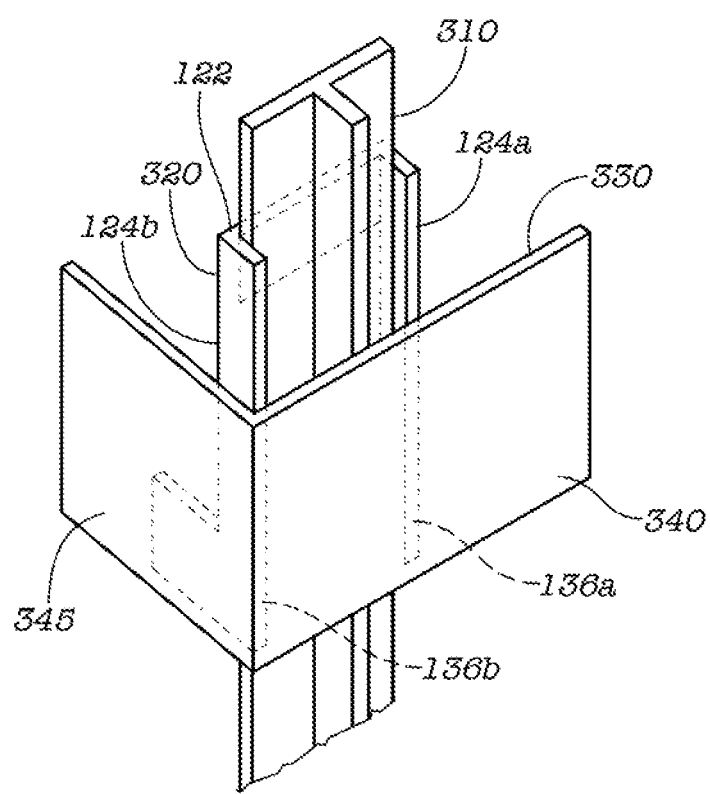
Figure 4A:
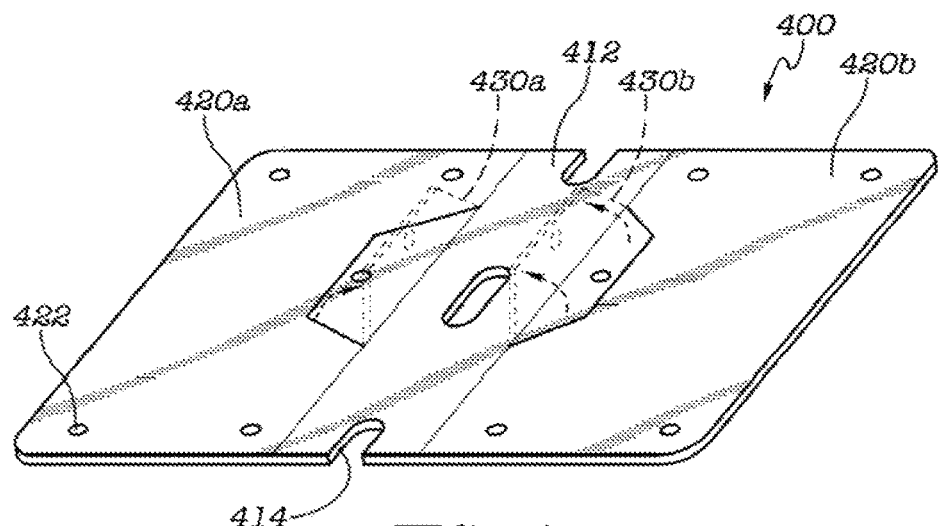
Figure 4B:
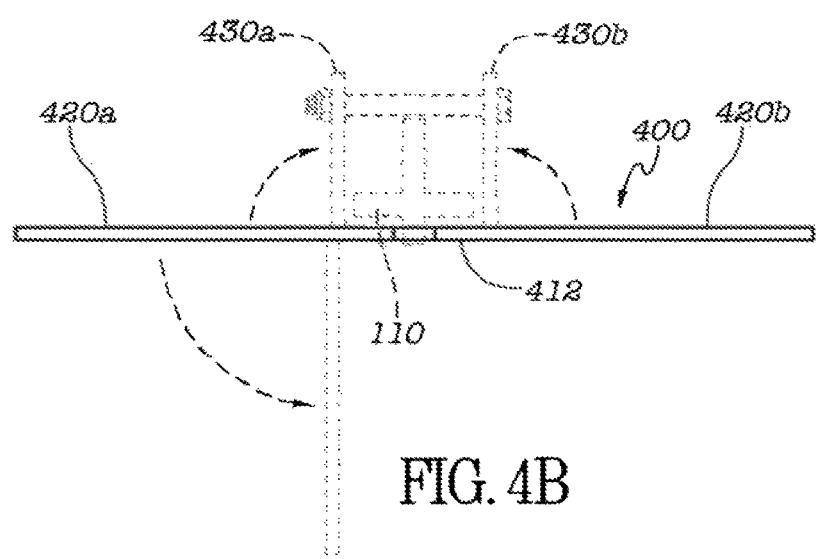
Figure 4C:
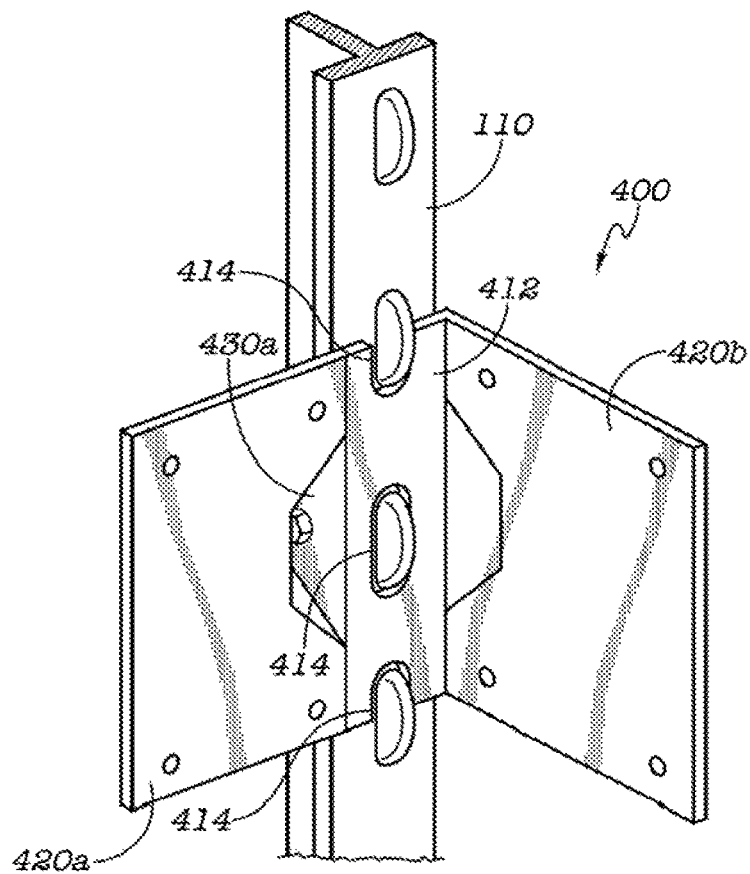
Figure 4D:
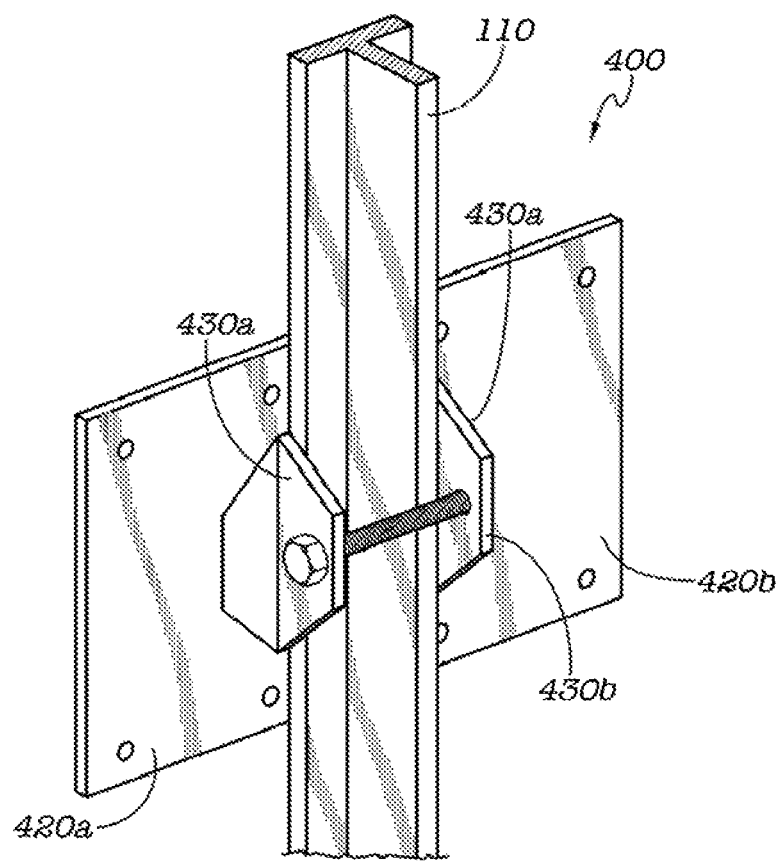

FIGS. 3 and 3A show an example bracket 300 for attaching a corner panel 315 to another panel 312 that is attached to a t-post 310. The bracket 300 includes a t-post attachment portion 320 (including the various components and configurations described with respect to bracket 100), which removably attaches to the t-post 310.

The bracket also includes a panel attachment portion 330 that is bent, shaped, or otherwise configured to join two panels, such as panel 312 and panel 315, at various joining angles. For example, the panel attachment portion 330 includes a first plate or attachment wing 340 that is fixed to the back edges 136a and 136b of the two opposing side plates 124a, 124b, and a second plate or attachment wing 345 that is fixed or runs parallel to the opposing side plate 124b.

For example, the panel attachment portion 330 includes a flat plate having a first attachment wing 340 positioned at an angle (e.g., at a right angle or other attachment angles) with respect to the second attachment wing 345. Using such a bracket 300, the panel 312 is joined to the panel 315 at an angle, which forms a right turn in a fence or other similar structure. Thus, the first attachment wing 340 is configured to position a first panel 312 proximate to the t-post 110, and the second attachment wing 345 is configured to position a second panel 315 proximate to the t-post 110, such that the second panel 315 is joined to the first panel 312 at a right angle.

Of course, the bracket 300 may be configured to join panels in other joining configurations, such as to form left turns, to connect corrals or other structures (e.g., two- or four-corral configurations), and so on.

FIGS. 4, 4A, 4B, 4C, and 4D, in other embodiments, show an example bracket 400 for attaching a panel to a t-post 110. Attachment bracket 400 includes a t-post attachment portion 410, such as a flat center plate 412 having one or more nub placement points 414 (e.g., holes or openings), where the nub placement points are configured (e.g., sized) to receive the nub 415 of the t-post 410, such that the bracket 400 rests on the nub 415 of the t-post 110 when the bracket 400 is attached to the t-post 110.

As shown in FIGS. 4, 4A, 4B, and 4C, the center plate 412 may include multiple nub attachment points 414 positioned to receive consecutive nubs located on the spine of the t-post 110. Thus, the center plate 412 and the nub attachment points 414 may be sized or shaped to complement the size and shape of the t-post 110 and/or the positions of the nubs 115 of the t-post 110, among other configurations.

The attachment bracket 400 also includes one or more panel attachment portions 420, such as bendable wing plates 420a and 420b, located on sides of the flat center plate 412, where the bendable wing plates 420a, 420b are configured to fix a panel to the t-post 110.

In some embodiments, when the bracket 400 is positioned on a t-post 110, a wing plate 420a or 420b may be bent to be perpendicular to the center plate 412 (FIGS. 4B, 4C), which facilitates attaching a panel at a corner of a fence or other structure supported by multiple t-posts 110. Thus, in some embodiments, the wing plate 420a may be utilized to attach a right turn panel to a structure and the wing plate 420b may be utilized to attach a left turn panel to a structure (e.g., to facilitate the joining of perpendicular or non-parallel panels of the structure).

As described herein, the bracket 400 may include one or more fasteners that fix the panel to a wing plate 420a, 420b, such as at attachment points 422 located on the wing plates 420a, 420b. Further, the bracket 400 may include post securement wings 430a, 430b, which, when bent and fastened together to wrap around the t-post 110, securely fix the bracket 400 to the t-post 110 (FIGS. 4A, 4B, 4C, and 4D).

Thus, in some embodiments, the brackets described herein provide a simple system for attaching boards/panels to t-posts, at various adjustable heights along the t-posts, and/or enable panels to be joined together at various angles and configurations. The brackets facilitate the placement of signs, fences, panels, boards, and other large flat objects, at locations where using t-post would be desirable over other posts or securing devices (e.g., locations where digging is non reasonable or possible) and/or enable a quick, simple, and low cost process for erecting temporary signs, fences, panels, boards, and so on.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the apparatus is not intended to be exhaustive or to limit the apparatus to the precise form disclosed herein. While specific embodiments of, and examples for, the apparatus are described above for illustrative purposes, various equivalent modifications are possible within the scope of the apparatus, as those skilled in the relevant art will recognize.

While certain aspects of the apparatus are presented below in certain claim forms, the inventors contemplate the various aspects of the apparatus in any number of claim forms.

Accordingly, the inventors reserve the right to add additional claims after filing the application to pursue such additional claim forms for other aspects of the apparatus.

What is claimed is:

1. A bracket system for removably attaching a panel to a t-post, the bracket system comprising:
    a bracket comprising
        a t-post attachment portion, the t-post attachment portion including a face plate and two opposing side plates, the face plate extending between the two opposing side plates and fixed to front edges of the two opposing side plates; and
        a panel attachment portion, the panel attachment portion including a flat plate, the flat plate fixed to and extending between back edges of the two opposing side plates;
    a t-post having a plurality of nubs projecting therefrom, the t-post being disposed within the t-post attachment portion of the bracket; and
    a panel attached to the panel attachment portion of the bracket,
    wherein the face plate extends between the two opposing side plates at upper portions of the two opposing side plates and the flat plate is fixed to lower portions of the two opposing side plates,
    wherein the bracket removably attaches to the t-post when the face plate rests on one of the plurality of nubs of the t-post and the flat plate contacts a back of the t-post, and
    wherein the two opposing side plates include bendable tabs at the lower portions of the front edges of the two opposing side plates; and wherein the bracket fixedly attaches to the t-post when the bendable tabs are bent to contact the t-post.

2. The bracket system of claim 1, further comprising:
    one or more fasteners that secure the flat plate of the bracket to the panel.

3. The bracket system of claim 1, wherein the flat plate has a surface area that is larger than a surface area of the face plate.

4. The bracket system of claim 1, wherein the flat plate of the panel attachment portion includes a first attachment wing that is fixed to the back edges of the two opposing side plates and a second attachment wing that is fixed to one of the opposing side plates, and wherein the panel is attached to at least one of the first attachment wing and the second attachment wing.

5. The bracket system of claim 4, wherein the first attachment wing is configured to position the panel proximate to the t-post, and wherein the second attachment wing is configured to position a second panel proximate to the t-post, such that the second panel is joined at a right angle to the panel.

6. A method for attaching a panel to a t-post, the method comprising:
    providing a t-post having a plurality of nubs projecting therefrom;
    positioning the t-post within a rectangular opening of an attachment bracket, the opening formed by two opposing side plates, a face plate extending between the two opposing side plates and fixed to front edges of the two opposing side plates, and a flat plate fixed to and extending between back edges of the two opposing side plates;
    removably securing the attachment bracket to the t-post by positioning the face plate on a nub of the t-post such that the flat plate contacts a back of the t-post;
    fastening the panel to the flat plate of the attachment bracket; and
    bending tabs located on the front edges of the two opposing side plates to contact the t-post.

7. A bracket system for attaching a panel to a t-post, the bracket system comprising:
    a t-post having a plurality of nubs projecting therefrom;
    a panel; and
    a bracket attached to the t-post, the bracket comprising
        an elongated flat center plate having a hole, the receiving one of the plurality of nubs of the t-post such that the bracket rests on the nub of the t-post, the elongated flat center plate having a pair of edges on opposite sides thereof;
        a pair of post securement wings coupled to the edges of the elongated flat center plate, the post securement wings bent towards one another and relative to the flat center plate and fastened together to wrap around the t-post; and
        one or more bendable wing plates coupled to the edges of the elongated flat center plate,
        wherein the post securement wings and the bendable wing plates are coupled to the edges of the flat center plate and bend relative to the flat center plate, and
        wherein the panel is attached to the one or more bendable wing plates.

8. The bracket system of claim 7, wherein a wing plate is bent to be perpendicular to the flat center plate.

9. The bracket system of claim 7, wherein the flat center plate includes additional holes configured to receive additional nubs of the t-post.

10. The bracket system of claim 7, further comprising:
    one or more fasteners that fix the panel to the one or more bendable wing plates of the bracket.

* * * * *